United States Patent [19]

Igarashi et al.

[11] Patent Number: 5,332,523
[45] Date of Patent: Jul. 26, 1994

[54] DISPERSION-STABILIZING AGENT FOR INORGANIC POWDER IN OILY MATERIAL

[75] Inventors: Taizo Igarashi, Hyogo; Susumu Honda, Tokyo; Tohru Yasukohchi, Kanagawa; Show Onodera, Hyogo, all of Japan

[73] Assignee: Nippon Oil & Fats Co., Ltd., Tokyo, Japan

[21] Appl. No.: 869,057

[22] Filed: Apr. 15, 1992

Related U.S. Application Data

[63] Continuation of Ser. No. 442,762, Nov. 29, 1989, abandoned.

[30] Foreign Application Priority Data

Nov. 29, 1988 [JP]  Japan .................. 63-299510

[51] Int. Cl.$^5$ .................. B01J 13/00; C08F 122/04
[52] U.S. Cl. .................. 252/309; 252/351; 106/504; 526/910; 526/271
[58] Field of Search .......... 252/309, 351; 106/504, 106/505; 526/270, 271, 910

[56] References Cited

U.S. PATENT DOCUMENTS

| | | | |
|---|---|---|---|
| 2,892,820 | 6/1959 | Stewart et al. | 526/271 X |
| 4,057,436 | 11/1977 | Davis et al. | 106/504 X |
| 4,354,872 | 10/1982 | Kekish et al. | 252/309 X |
| 4,946,904 | 8/1990 | Akimoto et al. | 526/271 X |
| 4,946,918 | 8/1990 | Akiyama et al. | 526/271 X |
| 5,081,111 | 1/1992 | Akimoto et al. | 526/271 X |
| 5,104,925 | 4/1992 | Honda et al. | 524/517 |
| 5,142,036 | 8/1992 | Akimoto et al. | 526/271 |
| 5,279,664 | 1/1994 | Robinson et al. | 252/351 |

FOREIGN PATENT DOCUMENTS

| | | |
|---|---|---|
| 0056627 | 1/1982 | European Pat. Off. |
| 0068847 | 6/1982 | European Pat. Off. |
| 0216479 | 8/1986 | European Pat. Off. |
| 0289713 | 11/1988 | European Pat. Off. |
| 0315167 | 5/1989 | European Pat. Off. |

OTHER PUBLICATIONS

Partial English Translation of EP-A 0289,713.
*The Condensed Chemical Dictionary*, 10th Ed., pp. 91, 115, 255, 256, 322, 392, 590, 693, 910, 992.
*The Condensed Chemical Dictionary*, 7th Ed., pp. 178, 459.

*Primary Examiner*—Robert L. Stoll
*Assistant Examiner*—Daniel S. Metzmaier
*Attorney, Agent, or Firm*—Sughrue, Mion, Zinn, Macpeak & Seas

[57] ABSTRACT

A dispersion stabilizing agent for inorganic powder in an oily material, comprising a copolymer of (i) a polyoxyalkylene derivative represented by the general formula [I] below with (ii) one or more of maleic acid and the derivatives thereof selected from the group of maleic anhydride, maleic acid, maleic acid salts, maleic acid amides, and maleic acid esters,

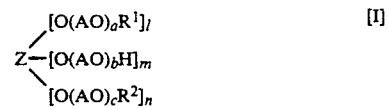

where Z is a residue of a compound having 2-8 hydroxyl groups, AO is an oxyalkylene group having 2-18 carbon atoms, $R^1$ is an unsaturated hydrocarbon group having 2-5 carbon atoms, $R^2$ is a hydrocarbon group having 1-40 carbon atoms, $a=0$ to 1000, $b=0$ to 1000, $c=0$ to 1000, $l=1$ to 8, $m=0$ to 2, $n=0$ to 7, $(l+m+n)=2$ to 8, $(al+bm+cn)=1$ to 1000, $m/(l+n) \leq \frac{1}{2}$.

4 Claims, No Drawings

DISPERSION-STABILIZING AGENT FOR INORGANIC POWDER IN OILY MATERIAL

This is a continuation of application Ser. No. 07/442,762 filed Nov. 29, 1989, now abandoned.

BACKGROUND OF THE INVENTION

1. Field of the Invention

The present invention relates to a dispersion-stabilizing agent for inorganic powder in an oily material. More particularly, the present invention relates to a dispersion-stabilizing agent for inorganic powder in an oily material, which can disperse an inorganic powder in an oily material within a short period of time and can stabilize the dispersion over a long period of time.

2. Related Background Art

Dispersion of inorganic powder in an oily material are used in various industrial fields. A familiar example is a paint, in which a pigment and a filler are dispersed in a resin solution. Recently, dispersions of inorganic powder in hydrocarbon oils have come to be used for abrasives and fuel tank cleaning liquids.

In such a dispersion in oil, a dispersion-stabilizing agent is generally employed for dispersing an inorganic powder into the oil. U.S. Pat. No. 4,354,872 discloses use of an alkanolamide, a fatty acid and magnesium lauryl sulfate for dispersing magnesium oxide in hydrocarbon oil.

The dispersion-stabilizing agents are required to be capable of dispersing the inorganic powder rapidly in an oily material within a short period of time, and are required simultaneously to be capable of stabilizing the inorganic powder without precipitating the inorganic powder over a long period of time, and to be capable of easily re-dispersing the inorganic powder even when it has precipitated.

Various dispersion-stabilizing agents have been reported to meet the requirements. However, none has satisfied simultaneously the above-mentioned two requirements.

SUMMARY OF THE INVENTION

The object of the present invention is to provide a dispersion-stabilizing agent for inorganic powder in an oily material, which satisfies the above-mentioned two requirements: namely, capability of dispersing inorganic powder rapidly in an oily material within a short period of time, and capability of stabilizing the inorganic powder over a long period of time.

According to the present invention, there is provided a dispersion stabilizing agent for inorganic powder in an oily material, comprising a copolymer of (i) a polyoxyalkylene derivative represented by the general formula [I] below and (ii) one or more of maleic acids and the derivatives thereof selected from the group of maleic anhydride, maleic acid, maleic acid salts, maleic acid amides, and maleic acid esters,

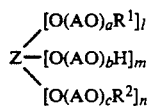
[I]

where Z is a residue of a compound having 2–8 hydroxyl groups, AO is an oxyalkylene group having 2–18 carbon atoms, $R^1$ is an unsaturated hydrocarbon group having 2–5 carbon atoms, $R^2$ is a hydrocarbon group having 1–40 carbon atoms, $a=0$ to 1000, $b=0$ to 1000, $c=0$ to 1000, $l=1$ to 8, $m=0$ to 2, $n=0$ to 7, $(l+m+n)=2$ to 8, $(al+bm+cn)=1$ to 1000, and $m/(l+n) \leq \frac{1}{2}$.

DETAILED DESCRIPTION OF THE PREFERRED EMBODIMENTS

The inventors of the present invention, after the comprehensive study to attain the above objects, have completed the present invention.

The dispersion-stabilizing agent of the present invention is a copolymer of (i) a polyoxyalkylene derivative represented by the general formula [I] shown above with (ii) one or more of maleic acid and its derivatives selected from the group of maleic anhydride, maleic acid, maleic acid salts, maleic acid amides, and maleic acid esters, where the polyoxyalkylene derivative unit and the maleic unit may respectively be composed of one kind of units or a mixture of two or more kinds of units.

The ratio of the polyoxyalkylene derivative units to the maleic units used is preferably be from 7:3 to 3:7, more preferably approximately 1:1 based on polymerizable double bond equivalence, but is not limited thereto. The average molecular weight of the copolymer is preferably from 1,000 to 2,000,000 in terms of weight average molecular weight, but is not limited thereto.

In the general formula [1], the compounds having 2–8 hydroxyl groups and containing Z as a residue include polyhydric alcohols such as ethylene glycol, propylene glycol, butylene glycol, dodecylene glycol, octadecylene glycol, neopentyl glycol, styrene glycol, glycerol, diglycerol, polyglycerol, trimethylolethane, trimethylolpropane, 1,3,5-pentanetriol, erythritol, pentaerythritol, dipentaerythritol, sorbitol, sorbitan, sorbide, a sorbitol-glycerol condensate, adonitol, arabitol, xylitol, and mannitol; polyhydric phenols such as catechol, resorcin, hydroquinone, and phloroglucin; saccharides such as xylose, arabinose, ribose, rhamnose, glucose, fructose, galactose, mannose, sorbose, cellobiose, maltose, isomaltose, trehalose, sucrose, raffinose, gentianose, and melezitose; and partially etherfied compounds or partially esterified compounds thereof.

The oxyalkylene groups denoted by AO having 2–18 carbons include an oxyethyelne group, an oxypropylene group, an oxybutylene group, an oxytetramethylene group, an oxystyrene group, an oxydodecylene group, an oxytetradecylene group, an oxyhexadecylene group, and an oxyoctadecylene group, the oxyalkylene group may be composed of one kind of units or a mixed adduct of two or more kinds of units, and the mixed adduct may be a random adduct or a block adduct.

The unsaturated hydrocarbon groups denoted by $R^1$ having 2–5 carbons include those having a polymerizable unsaturated bond such as a vinyl group, an allyl group, a methallyl group, a 3-butenyl group, a 4-pentenyl group, and a 3-methyl-3-butenyl group.

The hydrocarbon groups denoted by $R^2$ include those having 1–40 carbons, of which particularly those having 1–24 carbons are preferable, including methyl, ethyl, propyl, isopropyl, butyl, isobutyl, t-butyl, amyl, isoamyl, hexyl, heptyl, 2-ethylhexyl, octyl, nonyl, decyl, undecyl, dodecyl, isotridecyl, tetradecyl, hexadecyl, isohexadecyl, octadecyl, isooctadecyl, oleyl, octyldodecyl, docosyl, decyltetradecyl, benzyl, cresyl, butylphenyl, dibutylphenyl, octylphenyl, nonylphenyl, dodecylphenyl, dioctylphenyl, dinonylphenyl, styrenated phenyl, and naphthyl.

The polyoxyalkylene derivative represented by the general formula [I] have at least one $R^1$. The carbon number of $R^1$ affects to the polymerization reactivity: excessively long carbon chain of $R^1$ lowers the reactivity of the derivative, the above-mentioned range of the carbon number therefore being suitable. The derivative in which l, namely, the number of $R^1$, is 1 will give a linear copolymer, while the derivative in which l is 2 or more will give a crosslinked copolymer. The crosslinking degree can be adjusted by selecting the value of l to prepare a desired copolymer.

The value of (al+bm+cn) is limited to be not more than 1000, because the value exceeding 1000 is not easily attainable practically.

Regarding the relationship among l, m, and n, while m is defined to be in the range of from 0 to 2, an excessively high value of m relative to (l+n) is undesirable, because it causes gellation during the reaction to give a crosslinked ester which cannot be adjusted. Hence l, m, and n should be in the relationship of $m/(l+n) \leq \frac{1}{2}$.

The carbon number of AO may be selected arbitrarily from the range of from 2 to 18. By combination of AO with $R^2$, the ratio of the hydrophilic group to the lipophilic group may be adjusted.

Of the maleic acid group copolymerizing with the polyoxyalkylene derivative of the general formula [I] the maleic acid salts include the salts of ammonia; salts of monoamines such as methylamine, ethylamine, propylamine, butylamine, hexylamine, octylamine, 2-ethylhexylamine, nonylamine, decylamine, dodecylamine, isotridecylamine, tetradecylamine, hexadecylamine, isohexadecylamine, stearylamine, isostearylamine, oleylamine, linolamine, octyldodecylamine, docosylamine, decyltetradecylamine, and aniline; salts of polyamines such as ethylenediamine, tetramethylenediamine, dodecylpropylenediamine, octadecylpropylenediamine, oleylpropylenediamine, diethylenetriamine, triethylenetetramine, tetraethylenepentamine, and pentaethylenehexamine; salts of alkanolamines such as monoethanolamine, diethanolamine, triethanolamine, monoisopropanolamine, diisopropanolamine, triisopropanolamine, adducts of alkylene oxide to the aforementioned monoamines and polyamines; salts of amino acids such as lysine, arginine, and histidine; salts of alkali metals such as lithium, sodium, and potassium; and salts of alkaline earth metals such as magnesium, and calcium.

The maleic acid amides include reaction products of amidation of maleic anhydride with the aforementioned salt-forming amines. The maleic acid esters include reaction products of esterification of maleic anhydride or maleic acid with aliphatic, aromatic or alicyclic alcohols having 1–22 carbon atoms. Specific examples of the alcohols are butanol, hexanol, decanol, tridecanol, octadecanol, benzyl alcohol, and cyclohexanol.

The polisher is easily prepared by copolymerizing a polyoxyalkylene derivative of the general formula [I] with a maleic acid or its derivative in the presence of a radical initiator such as a peroxide. In the case where the maleic unit is other than maleic anhydride, a polyoxyalkylene derivative of the general formula [I] is preferably copolymerized with maleic anhydride in the presence of a radical initiator, and the maleic anhydride moiety is then hydrolyzed to a maleic acid moiety, neutralized to form a salt, reacted with an amine to form an amide, or reacted with alcohol to form an ester, because such procedures will produce easily a high molecular product in a simpler manner.

In the copolymerization, another copolymerizable component such as styrene, α-olefin, or vinyl acetate may be incorporated.

The copolymer thus prepared may vary properties thereof over a broad range by changing suitably Z, AO, $R^1$, $R^2$, l, m, n, and the maleic unit. The copolymers soluble in an oily material in a certain limited degree will be adsorbed better by an inorganic powder, giving favorable results, in comparison with the copolymers freely soluble or completely insoluble in the oily material. By a certain kind of inorganic powder, a copolymer having remaining carboxylic group is adsorbed better. In case where the maleic unit is a maleic acid salt, a maleic acid amide, or a maleic acid ester, the copolymer with the carboxyl group having been partially reacted, preferably 50% equivalent or less is in many cases preferred in comparison with the one with the carboxyl group having totally reacted.

The inorganic powder to be dispersed in the present invention is not limited, and the examples thereof are silicates such as kaolin (a white burning aluminum silicate), aluminum silicate, clay (a hydrated aluminum silicate), talc (a natural hydrous magnesium silicate), mica (any of several silicates of varying chemical compositions), asbestos powder (a group of impure magnesium silicate minerals), calcium silicate, sericite, and bentonite (a colloidal clay (aluminum silicate)); carbonates such as calcium carbonate, magnesium carbonate, barium carbonate, and dolomite (a carbonate of calcium and magnesium); sulfates such as calcium sulfate, and barium sulfate; metal oxides such as magnesium oxide, alumina, antimony oxide, titanium oxide, white carbon (a colloidal silica), diatomaceous earth (a soft bulky solid material which is 88% silica), and iron oxide; metal hydroxides such as aluminum hydroxide, magnesium hydroxide, calcium hydroxide, iron hydroxide, and metatitanic acid; metal powders such as aluminum powder, copper powder, and nickel powder; and other various inorganic powders such as silicon carbide, silicon nitride, boron nitride, zirconium oxide, barium titanate, satin white (a mixture of hydrated lime, potash alum, and aluminum sulfate), carbon black (finely divided forms of carbon), and graphite (a crystalline allotropic form of carbon characterized by a hexagonal arrangement of the atoms).

Average particle sizes of the inorganic powder vary significantly depending on the kind of the inorganic powder, but generally not more than 100 μm, and nominally and preferably in the range approximately from 0.1 to 50 μm.

The oils as the dispersion medium for dispersing the above-mentioned inorganic powder are not limited. The examples thereof include fuel oils such as kerosene, gas oil, and heavy oil; aliphatic hydrocarbons such as hexane, cyclohexane, and isooctane; aromatic hydrocarbons such as benzene, toluene, and xylene; ester oils such as ethyl acetate, dioctyl phthalate, soybean oil, and linseed oil; halogenated hydrocarbons such as 1,1,1-trichloroethane, trichloroethylene, and chlorodifluoromethane; liquid paraffin, liquid paint resin, liquid rubber, and so on.

The amount of the dispersion-stabilizing agent for an oily material to be used in the present invention is from 0.05 to 10 parts by weight, preferably from 0.1 to 7 parts by weight based on 100 parts by weight of the inorganic powder. The amount of 0.05 part by weight or less is ineffective, while the use of 10 parts by weight or more does not significantly enhance the effect, and is economically disadvantageous.

By employing the dispersion-stabilizing agent of the present invention, a dispersion of inorganic powder in oily material can be prepared in a conventional manner: for example, an inorganic powder is added to an oil containing the dissolved dispersion-stabilizing agent mentioned above, and the mixture is agitated.

In the present invention, the use of the specified copolymer of polyoxyalkylene derivative with a maleic unit as the effective ingredient makes it possible to disperse inorganic powder rapidly in an oily material within a short period of time and to prepare a dispersion of inorganic powder in an oily material which is stable over a long period of time.

The examples below illustrate specifically the present invention. The compounds shown in Table 1 were used for the dispersion-stabilizing agents in the examples of the present invention and the comparative examples. In the Examples, all percents are by weight.

EXAMPLE 1

200 g of precipitated calcium carbonate powder having an average particle diameter of 0.5 μm was placed as an inorganic powder in a 2-liter beaker. Thereto, 400 g of toluene was added which contains the dissolved dispersion-stabilizing agent in the indicated amount. The mixture was agitated with a 4-blade impeller at 120 rpm for 3 minutes, and then left to stand for 1 minute. The wettability, in the presence of the dispersion-stabilizing agent, of the precipitated calcium carbonate by toluene was evaluated from the state of the calcium carbonate powder remaining in the bottom of the beaker based on the four grades below.

1: The powder is entirely dispersed in the oil, and no powder remains at the bottom.

2: The powder is almost entirely dispersed in the oil, but only a slight portion of the powder remains undispersed at the bottom.

3: Approximately half of the powder remain undispersed at the bottom.

4: Most of the powder remain at the bottom.

The dispersions rated as 1, 2, and 3, excluding those rated as 4 respectively were violently agitated at 4,000 rpm for 5 minutes with an Autohomomixer (Type M, made by Tokushu Kika Kogyo K.K.), and the dispersion was transferred into a 500-ml measuring cylinder and left to stand for two days. Then a glass rod of 5 mm in diameter and 50 g in weight was allowed to fall through a guide provided on the upper portion of the measuring cylinder. The falling state was observed, and the dispersion stability was rated on two grades below:

1: The glass rod reaches the bottom of the cylinder.

2: The glass rod stops falling before reaching the bottom of the cylinder, a hard packed layer being formed.

The test results are shown in Table 2, which shows that the samples employing the dispersion-stabilizing agent of the present invention are superior in wettability and dispersion stability.

TABLE 1

| Sample No. | Compound of General Formula I (mole) | Maleic Anhydride (mole) | Other Monomer (mole) | Maleic Derivative (% equivalent to carboxyl group) | | Weight-Average Molecular Weight |
| --- | --- | --- | --- | --- | --- | --- |
| Example 1 | $CH_2=CHCH_2O(C_2H_4O)_5C_8H_{17}$ | 1.0 | 1.0 | — | — | 34,000 |
| Example 2 | $CH_2=CHCH_2O(C_2H_4O)_{20}C_{18}H_{37}$ | 1.0 | 1.0 | — | Dodecylamide 0.5 | 42,000 |
| Example 3 | $CH_2=CHCH_2O(C_3H_6O)_3(C_2H_4O)_3CH_3$ | 1.0 | 1.0 | — | Amide 0.5 | 11,000 |
| Example 4 | $CH_2=CHCH_2OCH_2CHCH_2O(C_2H_4O)_{10}C_4H_9$<br>$\|$<br>$O(C_3H_6O)_5H$ | 1.0 | 1.0 | — | Octadecyl-amide 0.3 | 17,000 |
| Example 5 | $CH_2=CHCH_2O(C_2H_4O)_8-C_6H_4-C_9H_{19}$ | 0.9 | | | | |
| | $CH_3$<br>$\|$<br>$CH_2=CCH_2O(C_3H_6O)_2(C_2H_4O)_{15}C_8H_{17}$ | 0.1 | 1.0 | — | — | 22,500 |
| Example 6 | $CH_2=CHCH_2OCH_2C[CH_2O(C_3H_6O)_3(C_2H_4O)_{10}CH_3]_3$ | 0.9 | 1.0 | Styrene 0.1 | 2-Ethylhexyl ether 0.4 | 66,000 |
| Example 7 | $C_2H_5$<br>$\|$<br>$CH_2=CHCH_2O\{(CH_2CHO)_2(C_2H_4O)_7\}C_4H_9{}^{*1)}$ | 0.9 | | | | |
| | | | 1.0 | — | Triethanol-amide salt 0.7 | 120,000 |
| | $CH_2=CHCH_2O(C_3H_6O)_{30}(C_2H_4O)_{70}CH_2CH=CH_2$ | 0.05 | | | | |
| Example 8 | $CH_3$<br>$\|$<br>$CH_2=C-CH_2O\{(C_4H_8O)_4(C_2H_4O)_7\}CH_3{}^{*1)}$ | 1.0 | 1.0 | — | Calcium salt 0.5 | 33,400 |
| Example 9 | $CH_2=CHCH_2O(C_2H_4O)_{10}(C_3H_6O)_{10}C_{18}H_{36}$ | 0.8 | 1.0 | Meta-acrylic acid 0.2 Diglycerin diallyl ether 0.05 | Dodecyl ester 0.2 | 77,000 |

TABLE 1-continued

| Sample No. | Compound of General Formula I (mole) | Maleic Anhydride (mole) | Other Monomer (mole) | Maleic Derivative (% equivalent to carboxyl group) | | Weight-Average Molecular Weight |
|---|---|---|---|---|---|---|
| Example 10 | $CH_2=CHCH_2OCH_2$<br>$\phantom{XXX}\|$<br>$[CHO(C_2H_4O)_8H]_2$<br>$\phantom{XXX}\|$<br>$[CHO(C_2H_4O)_8C_8H_{17}]_2$<br>$\phantom{XXX}\|$<br>$CH_2O(C_2H_4O)_8C_8H_{17}$ | 0.3 | 1.0 | Cyclo-hexylamide | 0.3 | 94,000 |
|  | $CH_2=CHCH_2O(C_3H_6O)_{20}(C_2H_4O)_{10}C_4H_9$ | 0.7 | | | | |
| Example 11 | $\phantom{XX}CH_3$<br>$\phantom{XXX}\|$<br>$CH_2=C-CH_2CH_2O(C_3H_6O)_{10}CH_3$ | 0.5 | | | | |
|  | $CH_2=CHCH_2OCH_2CHCH_2OC_{12}H_{25}$<br>$\phantom{XXXXXXXXXXXXXX}\|$<br>$\phantom{XXXXXXXXXXXX}O(C_2H_4O)_6C_{10}H_{21}$ | 0.5 | 1.0 | Na salt | 0.45 | 9,900 |
| Comparative Example 12 | Sorbitan monooleate | | | | | |
| Comparative Example 13 | Polyoxylethylene (10 moles) nonyl phenyl ether | | | | | |
| Comparative Example 14 | Sodium bis-2-ethylhexylsulfo-succinate | | | | | |

Note:
*[1] The group within the brackets { } is a random adduct.

TABLE 2

| | | Dispersion Stabilizing Agent | | | |
|---|---|---|---|---|---|
| Remarks | Test No. | Sample Number | Amount Used (%) | Wetta-bility | Dispersion Stability |
| Invention | 1 | 1 | 3.5 | 1 | 1 |
| " | 2 | 2 | 3.5 | 1 | 1 |
| " | 3 | 3 | 3.5 | 1 | 1 |
| " | 4 | 4 | 3.5 | 1 | 1 |
| " | 5 | 5 | 3.5 | 2 | 1 |
| " | 6 | 6 | 3.5 | 2 | 1 |
| " | 7 | 7 | 3.5 | 2 | 1 |
| " | 8 | 8 | 3.5 | 2 | 1 |
| " | 9 | 9 | 3.5 | 2 | 1 |
| " | 10 | 10 | 3.5 | 2 | 1 |
| " | 11 | 11 | 3.5 | 2 | 1 |
| Comparison | 12 | 12 | 3.5 | 2 | 2 |
| " | 13 | 13 | 3.5 | 3 | 2 |
| " | 14 | 14 | 3.5 | 3 | 2 |
| " | 15 | none | 0 | 4 | —[1] |

Note:
[1] The dispersion stability test was not conducted.

EXAMPLE 2

A mixture of 100 g of alumina powder having an average particle diameter of 0.5 μm and 100 g of titanium oxide powder having a particle diameter of 0.8 μm was used as the inorganic powder. The tests were conducted by employing a 500 g of gas oil containing the dissolved dispersion-stabilizing agent in the indicated amount relative to the weight of the inorganic powder in the same manner as in Example 1. The time period of standing for testing the dispersion stability was one week. The test results are shown in Table 3, which clearly shows that the samples employing the dispersion-stabilizing agent of the present invention are superior in wettability and dispersion stability.

TABLE 3

| | | Dispersion Stabilizing Agent | | | |
|---|---|---|---|---|---|
| Remarks | Test No. | Sample Number | Amount Used (%) | Wetta-bility | Dispersion Stability |
| Invention | 16 | 1 | 4 | 2 | 1 |
| " | 17 | 3 | 4 | 1 | 1 |
| " | 18 | 5 | 4 | 1 | 1 |
| " | 19 | 7 | 4 | 2 | 1 |
| " | 20 | 9 | 4 | 2 | 1 |
| " | 21 | 11 | 4 | 2 | 1 |
| Comparison | 22 | 12 | 4 | 2 | 2 |
| " | 23 | 13 | 4 | 3 | 2 |
| " | 24 | 14 | 4 | 3 | 2 |
| " | 25 | none | 0 | 4 | —[1] |

Note:
[1] The dispersion stability test was not conducted.

EXAMPLE 3

100 g of flaky graphite having an average particle diameter of 0.1 μm was used as the inorganic powder. The tests were conducted by employing 900 g of petroleum lubricant containing the dissolved dispersion-stabilizing agent in the indicated amount relative to the weight of the graphite, in the same manner as in Example 1. The time period of standing for testing the dispersion stability was one month. The test results are shown in Table 4, which shows that the samples employing the dispersion-stabilizing agent of the present invention are superior in wettability and dispersion stability.

TABLE 4

| | | Dispersion Stabilizing Agent | | | |
|---|---|---|---|---|---|
| Remarks | Test No. | Sample Number | Amount Used (%) | Wetta-bility | Dispersion Stability |
| Invention | 26 | 2 | 4 | 1 | 1 |
| " | 27 | 4 | 4 | 1 | 1 |
| " | 28 | 6 | 4 | 1 | 1 |
| " | 29 | 8 | 4 | 2 | 1 |
| " | 30 | 10 | 4 | 2 | 1 |

TABLE 4-continued

| Remarks | Test No. | Sample Number | Dispersion Stabilizing Agent Amount Used (%) | Wetta-bility | Dispersion Stability |
|---|---|---|---|---|---|
| Comparison | 31 | 12 | 4 | 3 | 2 |
| " | 32 | 13 | 4 | 3 | 2 |
| " | 33 | 14 | 4 | 3 | 2 |
| " | 34 | none | 0 | 3 | 2 |

EXAMPLE 4

200 g of carbon black having an average particle diameter of 0.05 μm as the inorganic powder was added to a mixture of 200 g of styrene-butadiene copolymerized oil-extended rubber (SBR #1712) and 200 g of a process oil containing the dissolved dispersion-stabilizing agent in the indicated amount relative to the carbon black. The mixture was milled for 5 minutes with a Banbury mixer. The mixture was then placed in a 100-ml measuring cylinder. The amount of the supernatant liquid was measured after one day and seven days. The results are shown in Table 5, which demonstrates that the samples employing the dispersion-stabilizing agent of the present invention separates less supernatant liquid, and is superior in dispersion stability.

TABLE 5

| Remarks | Test No. | Sample Number | Dispersion Stabilizing Agent Amount Used (%) | Supernatant (ml) One Day After | 7 Days After |
|---|---|---|---|---|---|
| Invention | 35 | 1 | 5 | 1.5 | 3.4 |
| " | 34 | 2 | 5 | 1.5 | 3.0 |
| " | 37 | 3 | 5 | 2.0 | 3.5 |
| " | 38 | 4 | 5 | 2.4 | 4.0 |
| " | 39 | 6 | 5 | 1.8 | 2.4 |
| " | 40 | 7 | 5 | 1.4 | 3.4 |
| " | 41 | 9 | 5 | 1.2 | 4.2 |
| " | 42 | 10 | 5 | 1.8 | 4.1 |
| Comparison | 43 | 12 | 5 | 20.4 | 35.4 |
| " | 44 | 13 | 5 | 22.2 | 33.4 |
| " | 45 | 14 | 5 | 19.4 | 30.0 |
| " | 46 | none | 0 | 20.4 | 30.3 |

EXAMPLE 5

100 g of aluminum powder having an average particle diameter of 1 μm as the inorganic powder was added to 400 g of an unsaturated polyester resin (Polylight: TP-210, made by Dainippon Ink and Chemicals, Inc.) containing the dissolved dispersion-stabilizing agent in the indicated amount relative to the aluminum powder. The mixture was agitated at 2000 rpm for 5 minutes with a homogenizer to prepare a dispersion. 100 ml of the dispersion was transferred into a 100-ml measuring cylinder and left to stand. After 14 days, the volume of the supernatant layer and the formation of hard pack were observed. The results are shown in Table 6, which demonstrates that samples employing the dispersion-stabilizing agent of the present invention give less supernatant layer and does not form a hard pack, thus being superior in dispersion stability.

TABLE 6

| Remarks | Test No. | Number | Dispersion Stabilizing Agent Amount Used (%) | 14 Days After Supernatant (ml) | Formation of Hard Pack |
|---|---|---|---|---|---|
| Invention | 47 | 1 | 10 | 8.5 | no |
| " | 48 | 3 | 10 | 7.8 | no |
| " | 49 | 5 | 10 | 7.9 | no |
| " | 50 | 7 | 10 | 6.6 | no |
| " | 51 | 9 | 10 | 7.0 | no |
| Comparison | 52 | 12 | 10 | 35.5 | yes |
| " | 53 | 14 | 10 | 40.7 | yes |
| " | 54 | none | 0 | 58.9 | yes |

While the invention has been described in detail and with reference to specific embodiment thereof, it will be apparent to one skilled in the art that various changes and modifications can be made therein without departing from the spirit and scope thereof.

What is claimed is:

1. A liquid composition consisting of an inorganic powder, an oil, said inorganic powder being compatible with said oil, and a polymer component which is a vinyl copolymer of (i) a polyoxyalkylene derivative represented by the general formula (I) below with (ii) one or more of maleic acid and the derivatives thereof selected from the group consisting of maleic anhydride, maleic acid, maleic acid salts, maleic acid amides, and maleic acid esters,

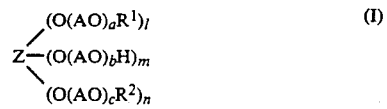

where Z is a residue of a compound having 2-8 hydroxyl groups, AO is an oxyalkylene group having 2-18 carbon atoms, $R^1$ is an unsaturated hydrocarbon group having 2-5 carbon atoms, $R^2$ is a hydrocarbon group having 1-40 carbon atoms, $a=0$ to 1000, $b=0$ to 1000, $c=0$ to 1000, $l=1$ to 8, $m=0$ to 2, $n=0$ to 7, $(l+m+n)=2$ to 8, $(al+bm+cn)=1$ to 1000, $m/(l+n)\leq \frac{1}{2}$.

2. The composition as in claim 1, wherein the inorganic powder is selected from the group consisting of aluminum silicate, magnesium silicate, calcium silicate, calcium carbonate, magnesium carbonate, barium carbonate, calcium magnesium carbonate, calcium sulfate, barium sulfate, calcium potassium aluminum sulfate, magnesium oxide, alumina, antimony oxide, titanium oxide, silicon oxide, iron oxide, aluminum hydroxide, magnesium hydroxide, calcium hydroxide, iron hydroxide, metatitanic acid, aluminum powder, copper powder, nickel powder, silicon carbide, silicon nitride, boron nitride, zirconium oxide, barium titanate, carbon black and graphite.

3. The composition as in claim 1, wherein the oil is selected from the group consisting of kerosene, gas oil, heavy oil, hexane, cyclohexane, isooctane, benzene, toluene, xylene, ethyl acetate, dioctyl phthalate, soybean oil, linseed oil, 1,1,1-trichloroethane, trichloroethylene, chlorodifluoromethane and a liquid paraffin.

4. The composition as in claim 1, wherein the amount of the vinyl copolymer is from 0.05 to 10 parts by weight based on 100 parts by weight of the inorganic powder.

* * * * *